(12) United States Patent
Preisenberger et al.

(10) Patent No.: US 12,459,083 B2
(45) Date of Patent: Nov. 4, 2025

(54) VACUUM UNIT

(71) Applicant: Festo SE & Co. KG, Esslingen (DE)

(72) Inventors: Georg Preisenberger, Esslingen (DE); Marco Kunze, Remshalden (DE); Oliver Ringelspacher, Esslingen (DE)

(73) Assignee: Festo SE & Co., KG, Esslingen (DE)

( * ) Notice: Subject to any disclaimer, the term of this patent is extended or adjusted under 35 U.S.C. 154(b) by 423 days.

(21) Appl. No.: 18/310,834

(22) Filed: May 2, 2023

(65) Prior Publication Data

US 2023/0347478 A1    Nov. 2, 2023

(30) Foreign Application Priority Data

May 2, 2022   (DE) ..................... 10 2022 110 636.5

(51) Int. Cl.
| | |
|---|---|
| *B25B 11/00* | (2006.01) |
| *B25J 15/06* | (2006.01) |
| *F04F 5/20* | (2006.01) |
| *F04F 5/46* | (2006.01) |

(Continued)

(52) U.S. Cl.
CPC ......... *B25B 11/005* (2013.01); *B25J 15/0625* (2013.01); *G05D 16/2013* (2013.01); *B25J 15/06* (2013.01); *B25J 15/0658* (2013.01); *F04F 5/20* (2013.01); *F04F 5/466* (2013.01); *F04F 5/52* (2013.01)

(58) Field of Classification Search
CPC combination set(s) only.
See application file for complete search history.

(56) References Cited

U.S. PATENT DOCUMENTS

| | | | |
|---|---|---|---|
| 4,861,232 A | * | 8/1989 | Ise ............................. F04F 5/20 248/205.9 |
| 5,481,482 A | | 1/1996 | Nagai et al. |
| 6,416,295 B1 | | 7/2002 | Nagai et al. |

(Continued)

FOREIGN PATENT DOCUMENTS

| | | |
|---|---|---|
| DE | 42 29 833 A1 | 3/1993 |
| DE | 100 42 488 A1 | 5/2001 |

(Continued)

OTHER PUBLICATIONS

Examination Report issued in corresponding German Patent Application No. 10 2022 110 636.5, Jan. 20, 2023, 7 pages.

*Primary Examiner* — Binh Q Tran
(74) *Attorney, Agent, or Firm* — HSML P.C.

(57) ABSTRACT

A vacuum unit with at least one vacuum generator, including a working unit with an ejector unit through which compressed air can flow for a vacuum generation and with an electrically actuable vacuum control valve which controls the application of compressed air to the ejector unit, further including a display and control module with a display module for visualizing status information and an operating device for manual input and/or interrogation of operating parameters. The display and control module is located on an upper side of the vacuum generator and is pivotably mounted on the working unit by means of a pivot bearing, so that it can be selectively positioned in a basic position covering the working unit or in at least one pivoted position pivoted upwardly away from the working unit by means of a module pivoting movement which can be executed with respect to a pivot center.

25 Claims, 5 Drawing Sheets

(51) Int. Cl.
 *F04F 5/52* (2006.01)
 *G05D 16/20* (2006.01)

(56) References Cited

U.S. PATENT DOCUMENTS

| | | | | |
|---|---|---|---|---|
| 6,444,035 | B1 * | 9/2002 | Nowak | B29C 39/10 |
| | | | | 264/102 |
| 7,877,876 | B2 * | 2/2011 | Burke | B41J 2/1623 |
| | | | | 29/840 |
| 10,609,822 | B1 * | 3/2020 | Brevemark | B05B 15/55 |
| 2002/0155005 | A1 * | 10/2002 | Schmalz | F04F 5/52 |
| | | | | 417/187 |
| 2003/0082057 | A1 * | 5/2003 | Cho | F04F 5/20 |
| | | | | 417/182 |
| 2004/0163602 | A1 * | 8/2004 | Correa | A01K 45/007 |
| | | | | 119/6.8 |
| 2008/0291235 | A1 | 11/2008 | Schmalz | |
| 2010/0303641 | A1 | 12/2010 | Medow et al. | |
| 2011/0192481 | A1 | 8/2011 | Wenske et al. | |
| 2022/0403856 | A1 * | 12/2022 | Matsumura | F04F 5/466 |

FOREIGN PATENT DOCUMENTS

| | | |
|---|---|---|
| DE | 10 2004 031 924 A1 | 1/2006 |
| DE | 10 2007 058 114 A1 | 6/2009 |
| EP | 2300721 B1 | 4/2017 |
| WO | 2009/127223 A1 | 10/2009 |

\* cited by examiner

VACUUM UNIT

This application claims priority to German application 10 2022 110 636.5, filed May 2, 2022, which is incorporated by reference.

The invention relates to a vacuum unit with at least one vacuum generator extending in a main direction along a main axis, in a height direction along a vertical axis orthogonal to the main axis and in a transverse direction along a transverse axis orthogonal both to the main axis and to the vertical axis, which vacuum generator has two axial end faces oriented in opposite directions in the main direction, an upper side oriented in the height direction and a lower side opposite the upper side, the vacuum generator having a working unit with an ejector unit through which compressed air can flow in order to generate a vacuum which can be tapped at a vacuum tapping opening of the working unit, and an electrically actuable vacuum control unit which controls the application of compressed air to the ejector unit required for this purpose, the vacuum generator has a display and control module which extends, when a basic position is assumed, in the main direction along the working unit on the top side of the vacuum generator away from the working unit and which comprises a display module for visualization of status information and a control module for manual input and/or interrogation of operating parameters.

A vacuum unit of this type is disclosed in EP 2 300 721 B1 and includes a working unit which has, among other things, an ejector unit and a vacuum control valve designed to control the ejector unit. Compressed air applied to the ejector unit by the vacuum control valve generates a vacuum in a suction zone, which can be tapped at a vacuum tapping opening formed on the outside of the vacuum generator. The vacuum can be used, for example, to operate a suction gripper. Along the top side of the working unit extends a display and control module, referred to as the contacting unit, which is attached to the working unit and has an LCD display on an upward-facing functional side for displaying various operating states and input means in the form of keys for manual setting of internal control electronics. The contacting unit is plugged onto the top of the working unit, which for this purpose has at least one communication interface arranged on the vacuum control valve and designed as a plug-in device.

DE 10 2004 031 924 A1 describes a vacuum unit with several vacuum generators, each designated as an ejector, which are jointly attached to a holding device. Each vacuum generator has various keys and several displays on a top side for inputting and visualizing operating parameters.

A vacuum unit is known from DE 10 2007 058 114 A1, which has a vacuum generator equipped with an ejector unit and a control valve designed to actuate the ejector unit. The vacuum generator also includes a control module for electrically actuating the control valve.

SUMMARY OF THE INVENTION

The invention is based on the task of providing measures for a vacuum unit which permit convenient operation while maintaining compact dimensions.

This task is solved in a vacuum unit comprising the above mentioned features, wherein the display and control module is pivotably mounted on the working unit by means of a pivot bearing, so that it can be positioned by a module pivoting movement, which can be executed with respect to a pivot center, optionally in the basic position or in at least one pivoted position pivoted upwards away from the working unit.

The vacuum unit according to the invention contains one or more vacuum generators, each of which can be used to generate a vacuum that can be tapped at a vacuum tapping opening according to the suction nozzle principle. The at least one vacuum generator contains an ejector unit through which compressed air can flow to generate the vacuum. The ejector unit is also a component of an assembly referred to as a working unit, as is an electrically operable vacuum control valve, by means of which the pressurization of the ejector unit by compressed air required for vacuum generation can be controlled. The vacuum generator further includes a display and control module which, when the vacuum unit is used as intended, can assume a basic position on the top of the vacuum generator in which it covers the working unit in a main direction along at least a partial length.

On a functional side facing away from the working unit, the display and control module has a display module designed for visualization of status information and a control module designed for manual input and/or query of operating parameters. Since the display and control module extends along an upper side of the working unit oriented orthogonally to the main direction, the vacuum generator can be realized with compact overall length dimensions while ensuring convenient operability. The information visualized by the display module can be easily seen and the operating device can be operated with easy access.

A further advantage is the pivoting/swivelling capability of the display and control module which, if required, permits at least temporary swivelling from the basic position into a swivelling position swivelled upwards away from the working unit, for example in order to align the functional side equipped with the display module and the control module in a way that is favorable for handling and viewing and/or in order to make areas of the working unit that are concealed by the display and control module in the basic position accessible without having to dismantle the display and control module from the working unit. A module swivel movement can, for example, make accessible any display and/or operating elements of the working unit that are concealed by the display and control module in the basic position and/or create the prerequisite for easy assembly and disassembly of the vacuum control valve without being obstructed by the display and control module or even having to remove the display and control module from the working unit. The display and control module, which is temporarily swiveled into a swiveling position, can also be swiveled back into the basic position swiveled towards the working unit at any time.

Advantageous further embodiments of the invention are apparent from the subclaims.

It is expedient that the display and control module is fixed in its basic position by latching with the working unit in a detachable, non-pivoting manner. Preferably, a latching connection is provided which, when the display and control module is swiveled into the basic position, is automatically activated due to a certain elasticity and causes a releasable latching. The latching connection is designed in particular so that it automatically unlatches due to a certain elasticity when a swiveling force is manually applied to the display and control module. The aforementioned latching of the display and control module ensures that the basic position is reliably maintained even in installation positions of the vacuum unit in which the top of the at least one vacuum generator is oriented horizontally or downwards.

In particular the pivot bearing is designed so that the module pivot/swivel movement of the display and control module takes place in a pivot plane or swivel plane that is parallel to both the main axis and the vertical axis of the vacuum generator.

Preferably, the pivot bearing is designed such that the swivel center of the module swivel movement is defined by a swivel axis extending in the transverse direction of the vacuum generator. In this case, it is advantageous if the swivel axis is arranged stationary with respect to the working unit in any direction orthogonal to the transverse axis and does not undergo any change in position. In this way, the display and control module can be swiveled particularly precisely and positioned as desired.

The display and control module can in principle be integrally connected to the working unit, with the pivot bearing having a flexurally elastic solid-state joint or flexure hinge for defining the swivel center. However, a simpler manufacture and particular durability are promised by a preferred design in which the display and control module is a separate component with respect to the working unit and the pivot bearing has at least one swivel bearing body which defines the swivel axis and via which the display and control module is coupled to the working unit so that it can swivel.

The at least one pivot bearing body is expediently a separate body with respect to the display and control module and/or the working unit.

The at least one pivot bearing body is, for example, a pivot bearing pin that is fixed to the working unit and around which the display and control module engages either completely or partially in a pivotable manner. In the case of only partial engagement, the pivot bearing can be designed so that the display and control module can be clipped onto the swivel bearing pin.

The pivot bearing has, for example, only one swivel bearing body or several and in particular two swivel bearing bodies.

The pivot bearing is expediently arranged in the area of one of the two axial end faces of the at least one vacuum generator. The swivel center of the module swivel movement is therefore assigned to one of the two axial end faces of the vacuum generator. In conjunction with a swivel axis aligned parallel to the transverse axis of the vacuum generator, this makes it possible to swivel the display and control module into a swivel position in which the largest possible area of the working unit is accessible from the top without obstruction.

It is considered particularly favorable if the swivel center for the module swivel movement and the vacuum tapping opening are assigned to opposite axial end faces of the working unit. In this case, the vacuum tapping opening is located in the area of that of the two axial end faces of the vacuum generator which is opposite to that axial end face of the vacuum generator in whose area the pivot bearing is located. This allows the display and control module to be used and handled at the greatest possible distance from the vacuum tapping opening with a correspondingly reduced risk of interference from, for example, a suction gripper connected to the vacuum tapping opening.

The display and control module is conveniently shorter than the working unit, whereby in its basic position it extends in the main direction only over a partial length of the working unit. In the basic position of the display and control module, only a section of the length of the working unit that is shorter than the total length of the working unit and adjoins the swivel center is thus covered by the display and control module. Thus, even in the basic position of the display and control module, a section of the outer surface of the working unit oriented in the same direction as the functional side of the display and control module is available for forming display and/or control elements that are easily accessible at all times.

Preferably, the pivot bearing is arranged in the area of the upper side of the vacuum generator, in particular in such a way that the swivel center lies in the height direction of the vacuum generator at least essentially at the same height as an upward-facing upper outer surface of the working unit. This makes it possible, among other things, to ensure that the display and control module swiveled out of the basic position does not cause any or only a slight extension of the vacuum generator. This favors accommodation of the vacuum generator where space is limited. This design is considered particularly advantageous in combination with a design in which the pivot bearing is arranged in the area of one of the two axial end faces of the vacuum generator.

It is favorable if the display and control module can be swiveled from the basic position at least into an upright swivel position in which it is swiveled upward by 90 degrees with respect to the basic position. With a swivel axis parallel to the transverse axis of the vacuum generator, the functional side of the display and control module is oriented in the main direction in the 90-degree swivel position. The pivot bearing can be designed in such a way that the maximum swivel angle of the display and control module is limited to 90 degrees, although a larger swivel angle can also be made available without further ado.

In the transverse direction of the vacuum generator, the display and control module has the same width as the vacuum control valve. Accordingly, in the basic position of the display and control module, the vacuum control valve is completely covered over the entire length covered by the display and control module. The display and control module can be equipped with an easy-to-read display module and easy-to-operate control module without increasing the overall width of the vacuum generator beyond the width of the vacuum control valve.

In order to supply the vacuum control valve with the electrical control signals required for its operation, in particular to apply or remove an actuating voltage, it is advantageous if the working unit has a communication structure inside it that is electrically connected to the vacuum control valve and is connected or at least connectable to an electronic control unit. The electronic control unit may be an integral part of the vacuum unit or an external unit. The communication structure expediently has an interface for connection to an internal or external electronic control unit that provides the electrical control signals for driving the vacuum control valve. Preferably, there is an electrical connection between the communication structure and the display and control module, which is implemented by means of a flexible conductor strand, in particular a flexible flat cable, preferably extending inside the vacuum generator, which is deformable during the module swivel movement. Therefore, it is unnecessary to uncouple the flexible conductor strand from the display and control module and the operating device, when a module swiveling movement is to be carried out. The bending flexibility can refer to the entire length of the conductor strand or only to a partial length in the area of the pivot bearing. Preferably, the flexible conductor strand is designed as a flexible ribbon cable.

A preferred design of the display and control module has a module housing in which at least one module board is arranged, which at least partially supports/carries the display module and the control module. Preferably, the module housing is at least partially transparent on the function side in order to make information visualized by the internal display module visible from the outside. The module housing can also have wall openings on the function side for operating elements of the operating device. The flexible conductor strand as mentioned above is connected in particular to the module board for electrical connection to the display module and to the operating device, preferably by means of a plug-in connection.

In an expedient embodiment of the vacuum unit, at least one and preferably each vacuum generator has in the region of its upper side an upper outer surface formed on the working unit, which is at least partially covered in the basic position of the display and control module, wherein at least one manually activatable actuating element and/or at least one display element is arranged in the region covered by the display and control module, wherein a respective actuating and/or display element is accessible from the upper side of the vacuum generator in at least one pivoted position of the display and control module pivoted up from the basic position. The user of the vacuum generator thus has the option of using display and/or actuating elements of the working unit despite temporary inaccessibility by moving the display and control module into a corresponding swivel position.

The at least one actuating element and/or the at least one display element of the working unit is in particular a component of the vacuum control valve. In particular, at least one actuating element can belong to a manually activatable manual override actuator of the vacuum control valve, with which the vacuum control valve can be manually actuated independently of electrical control signals, for example for setup or test purposes. At least one display element of the vacuum control valve is, for example, a status display element that visualizes the current operating status of the vacuum control valve, in particular a switching position thereof.

In an expedient embodiment, the working unit of at least one vacuum generator has a base unit which contains the ejector unit and on which a valve mounting surface is also formed, to which the vacuum control valve is attached in a particularly detachable manner.

Detachability of the vacuum control valve favors assembly and disassembly to and from the base unit as needed. The vacuum control valve is fixed to the base unit in particular by a screw connection.

The pivotable mounting of the display and control module is provided on the base unit, in particular in such a way that the display and control module in its basic position at least partially covers the vacuum control valve mounted on the valve mounting surface. The display and control module can be pivoted within the framework of the module pivoting movement into at least one pivoted position in which the covering of the vacuum control valve is removed, so that unhindered assembly and disassembly of the vacuum control valve is possible, in particular from the top side of the vacuum generator.

It is expedient for the base unit to have a valve receiving area which is open at least towards the top of the vacuum generator, which is bounded on one underside by the valve mounting surface and in which the mounted vacuum control valve is completely or partially received. In the area of one of the two axial end faces of the vacuum generator, the valve receiving area is bounded by a module support section of the base unit carrying the display and control module. The display and operating element is pivotably mounted on the module support section via the pivot bearing. The flexible conductor strand already mentioned above can extend through the module support section if it is present. The module support section is at least partially hollow for this purpose. The swivel center defined by the pivot bearing with the cooperation of the module support section is expediently located in the main direction at a distance in front of the vacuum control valve, so that at least in a 90-degree swivel position of the display and control module the vacuum control valve is completely uncovered on its upper side facing in the height direction.

A practical design of the vacuum unit provides that on at least one vacuum generator, the base unit has a base body comprising the valve mounting surface and a silencer housing containing a silencer attached to the base body in a joining area. The silencer housing is attached to the base body, in particular in the main direction. Inside the base body, at least part of its length extends the ejector unit, which has a jet nozzle, a capture nozzle and a suction zone arranged between the jet nozzle and the capture nozzle. Preferably, the ejector unit is oriented with the ejector longitudinal axis parallel to the main axis. In principle, the ejector unit can be accommodated completely in the base body, but preferably extends through the joining area so that it is accommodated partly in the base body and partly in the silencer housing. The ejector nozzle is fluidically connected to the vacuum control valve mounted on the valve mounting surface via an air injection channel formed in the base body, so that the vacuum control valve is capable of controlling a pressurization of the air injection channel for vacuum generation. The suction zone of the ejector unit is in fluid communication with the vacuum tapping opening formed on an outer vacuum tapping surface of the base unit via a vacuum channel. For example, a suction gripper used for handling purposes or another device to be subjected to a vacuum can be connected to the vacuum tapping opening. An air exhaust channel passing through the silencer housing and the silencer located therein is connected to the suction nozzle, through which the compressed air required for vacuum generation is blown out to the environment as exhaust air. For this purpose, an air exhaust opening formed on an air exhaust surface is located on the silencer housing. While the vacuum tapping opening preferably points in the main direction, the air exhaust opening is expediently aligned at right angles to it and in particular in the height direction.

The module support section belonging to the base unit is expediently attached to the base body as a separate component, in particular with the aid of a screw connection. The base body is expediently located between the silencer housing and the module support section in relation to the main direction. The silencer housing is also suitably fixed to the base body by means of a screw connection.

Preferably, the at least one vacuum generator is equipped with means that allow the vacuum generated in the vacuum channel to be switched off quickly if required. As a result, objects held by means of a suction gripper connected to the vacuum tapping opening can be deposited or ejected again very quickly if required. Said means include in particular a ventilation channel which communicates with the vacuum channel and through which the vacuum channel can be pressurized with overpressure if required. This pressurization can be controlled by means of the vacuum control valve.

In operation, the active ventilation of the vacuum channel will be carried out regularly in a pulse-like manner with a short overpressure pulse, which will also be referred to as an ejector pulse in the following, since it helps to actively eject an object held by means of a suction gripper.

Preferably, an air regulator is inserted in the course of the air ventilation channel, which has a choke suitable for variable adjustment of a flow cross-section, which is designed in particular as a throttle screw. This throttle screw has an actuating section which can represent an actuating element of the working unit already mentioned above. The choke can be used to adjust the intensity of the ejector pulse in order to be able to take individual account of the characteristics of an object to be handled by a suction gripper.

It is advantageous if the air pressure prevailing at the vacuum tapping opening can be monitored. To make this possible, it is useful if the vacuum tapping opening communicates with a sensor channel that leads to a pressure sensor accommodated in the working unit, which can consequently detect the pressure prevailing at the vacuum tapping opening. In particular, the pressure sensor is used to monitor a negative pressure desired at the vacuum tapping opening. Preferably, the sensor channel for connection to the vacuum tapping opening is connected to the aforementioned vacuum channel in which the same pressure prevails as at the vacuum tapping opening. The pressure sensor is expediently accommodated in the aforementioned base body of the working unit.

The pressure sensor is conveniently mounted on a printed circuit board, hereinafter also referred to as sensor board, which is fixed in the base body. The sensor board can house evaluation electronics that evaluate the pressure values determined by the pressure sensor and trigger result-dependent measures, for example automated switching on and off of a compressed air supply with respect to the air injection channel to implement an air-saving circuit. Diagnostic functions can also be implemented in the evaluation electronics. Preferably, the evaluation electronics are connected via the sensor board to the electronic control unit already mentioned above, in particular via the internal communication structure of the working unit also mentioned above.

The vacuum control valve of the at least one vacuum generator is designed to control the application of compressed air to the associated ejector unit. In particular, it is capable of selectively causing a supply of compressed air to the jet nozzle of the ejector unit or of interrupting the supply of compressed air. Optionally, the possibility of venting the inlet of the ejector unit through the vacuum control valve can be provided, in particular in cases where no separate ventilation channel is available.

The controlled application of compressed air to the ejector unit and the optional ventilation channel takes place in a coordinated manner. For this purpose, the vacuum control valve can be designed as a 3/3-way valve, for example, which has a shut-off position as a further switching position, in which neither the ejector unit nor the air ventilation channel is pressurized with compressed air.

The vacuum control valve is in particular an electropneumatically pilot-operated directional control valve.

In one possible embodiment, the vacuum unit comprises a single vacuum generator, so that one can speak of a vacuum unit in the form of a stand-alone vacuum generator. However, a preferred embodiment provides that the vacuum unit has a plurality of vacuum generators that are combined in a vacuum generator assembly and mechanically interconnected in such a way that uniform handling is possible. In this case, the plurality of vacuum generators are lined up in a direction orthogonal to their main direction and are directly or indirectly mechanically connected to each other, for example by means of a plurality of tie rods. In particular, this is a detachable connection. The working units of the vacuum generators arranged in a row are traversed in the direction of the row by a common feed channel for connection to an external compressed air source, which is referred to as an assembly feed channel and which is connected in each vacuum generator to its vacuum control valve in order to provide the compressed air required for controlling the pressurization of the ejector unit and optionally of a ventilation channel.

To cope with a wide range of control tasks, the vacuum generator assembly can be equipped not only with vacuum generators as functional units, but also with one or more valve units that are not used for vacuum generation but enable pneumatic actuation of pneumatic drives, for example linear drives actuated with compressed air. Such valve units can be arranged together with the vacuum generators in groups or in any order in the direction of arrangement.

For the control of the multiple vacuum control valves contained in the vacuum generator assembly, it is advantageous if the vacuum generators are interspersed in the direction of alignment by an electrical communication line which is electrically connected within each vacuum generator with its vacuum control valve and the display and control module. In each vacuum generator, the communication line assumes the function of the communication structure mentioned above.

BRIEF DESCRIPTION OF THE DRAWINGS

The invention is explained in more detail below with reference to the accompanying drawing. In this show:

FIG. 8 shows the assembled vacuum generator with the display and control module swiveled up 90 degrees, and FIG. 9 shows the vacuum generator in a disassembled state with the display and control module swiveled to a 90-degree swivel position and the vacuum control valve removed from a base unit.

DETAILED DESCRIPTION OF THE INVENTION

FIGS. 1 to 4 show a vacuum unit 1 having, inter alia, a plurality of vacuum generators 2, one of said vacuum generators 2 being separately illustrated also again in FIGS. 5 to 9.

Each vacuum generator 2 is capable of generating, independently of the other vacuum generators 2, a vacuum which can also be referred to as negative pressure and which can be tapped for any purpose at a vacuum tapping opening 3 accessible from the outside.

Figure 1:
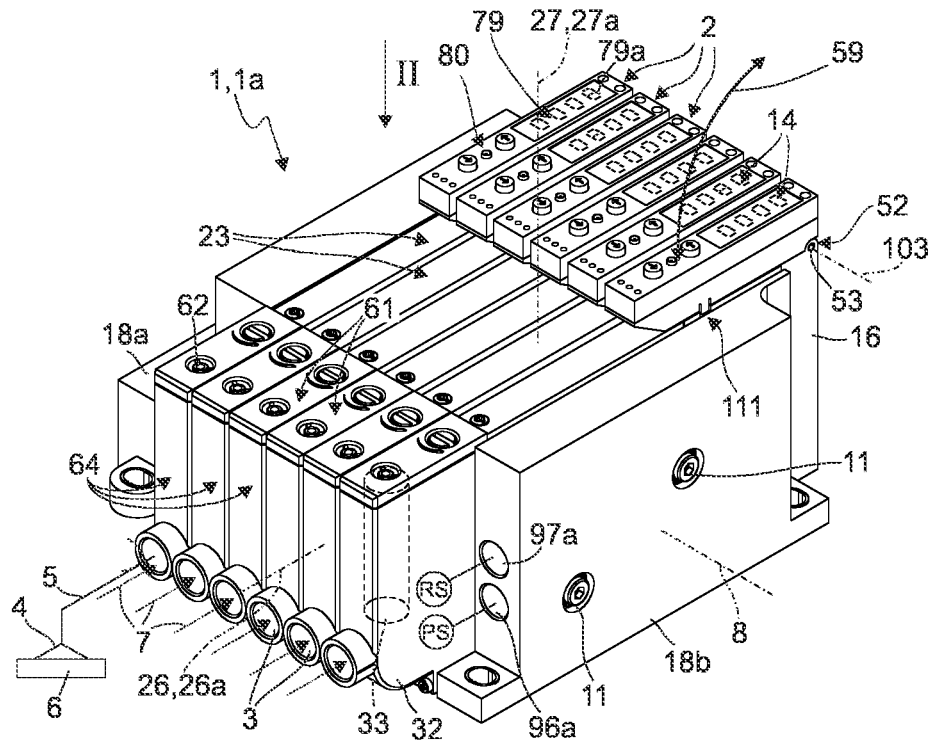
FIG. 1: a preferred design of the vacuum unit according to the invention in a perspective view in a practical design as a vacuum generator assembly, wherein the display and control modules are shown in their basic position and wherein a controllable suction gripper is schematically indicated.
Figure 2:
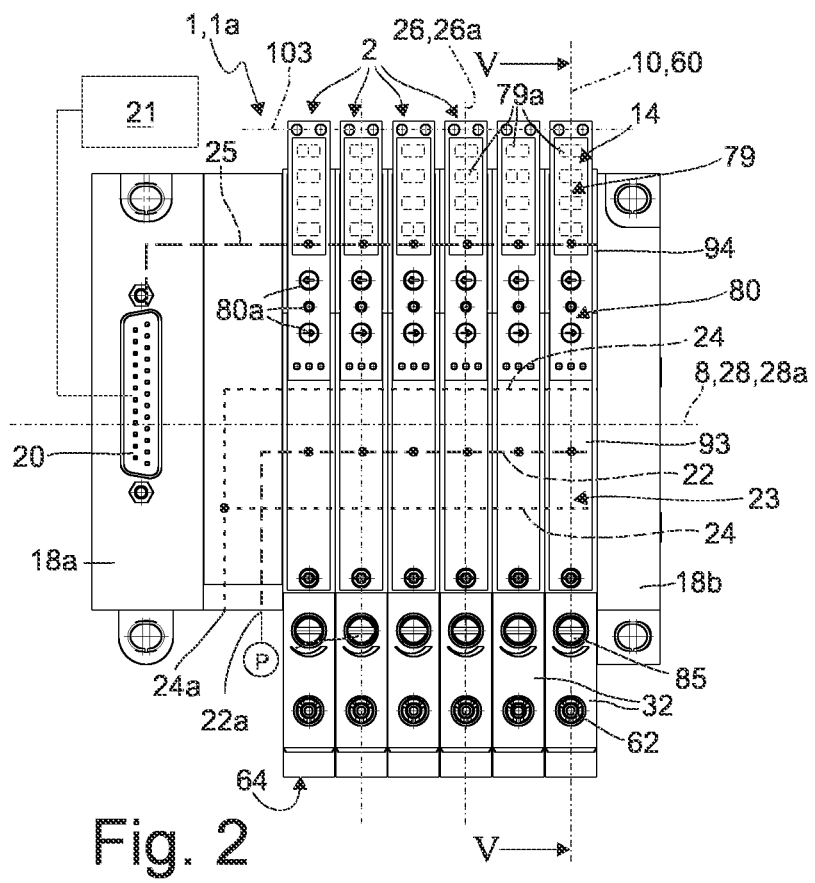
FIG. 2: a top view of the vacuum generator in FIG. 1, looking in the direction indicated by arrow II in FIG. 1, FIG. 3: another perspective view of the vacuum unit according to FIGS. 1 and 2 from an angle different from FIG. 1, FIG. 4: the vacuum unit of FIGS. 1 to 3 in a perspective view, wherein the display and control module of a vacuum generator unit is shown in a swivel position swiveled from the basic position, which is a 90-degree swivel position.

A preferred use of the vacuum unit 1 provides for the operation of suction grippers 4, one of which is schematically indicated in FIG. 1, wherein such a suction gripper 4 can be or is detachably connected to each vacuum tapping opening 3 via a suction line 5. With the aid of the suction gripper 4, an object 6, for example a workpiece, can be temporarily held for the purpose of its handling and, in particular, its repositioning under vacuum. The suction gripper 4 contains, for example, one or more suction cups. For gripping and holding an object 6, the suction gripper 4, which is attached to the object 6 with a suction opening, is evacuated, which is caused by the aforementioned vacuum that produces a suction flow 7 indicated by arrows. For depositing the object 6, the vacuum can be cancelled and the suction gripper 4 can be ventilated with atmospheric pressure or positive pressure. The functionality in this regard is also provided by the vacuum generator 2.

In an unillustrated embodiment, the vacuum unit 1 includes only a single vacuum generator 2. In the illustrated preferred embodiment, the vacuum generator 2 is equipped with a plurality of vacuum generators 2 that are combined into a uniformly operable assembly by mechanical connection, so that the vacuum unit 1 can be referred to as a vacuum generator assembly 1a. The plurality of vacuum generators 2 are operable independently of each other.

Within the vacuum generator assembly 1a, the vacuum generators 2 are lined up side by side in a line-up direction 8 indicated by dash-dot-lines and are mechanically connected to one another. For the mechanical connection, a number of rod-shaped tie rods 11 are provided as an example, which pass through the vacuum generators 2 lined up side by side in the line-up direction 8 and, in particular, clamp them together in a releasable manner. Alternatively, it could be provided that the vacuum generators 2 are fastened to the respective adjacent vacuum generator 2 by fastening screws or are mounted independently of one another on a common, for example plate-shaped vacuum unit carrier.

The illustrated preferred design of the vacuum generator assembly 1a contains only functional units designed as vacuum generators 2. In a non-illustrated embodiment, the vacuum generator assembly 1a also contains other types of functional units, in particular one or more valve units suitable for pneumatic actuation of pneumatic drives.

The vacuum generator assembly 1a expediently also has two end modules 18a, 18b, which are attached to the two end faces of the row of vacuum generators 2 opposite each other in the direction of juxtaposition 8 and are expediently also fixed by the tie rods 11 or other fastening means.

For controlling the operation of the vacuum generators 2, an electronic control unit 21 is expediently provided, which is exemplarily an external control unit connected to an electromechanical interface 20 of the vacuum generator assembly 1a, which is exemplarily arranged on a first end module 18a of the two end modules 18a, 18b. The electromechanical interface 20 can be designed as a multi-pin connector for parallel signal transmission or as a fieldbus connector for serial signal transmission.

In addition or as an alternative to the external electronic control unit 21, the vacuum generator assembly 1a may include an internal electronic control unit and/or an internal fieldbus communication unit.

Each vacuum generator 2 is capable of controlling the flow of compressed air required for vacuum generation and, if necessary, for actuating the suction grippers 4. This compressed air is supplied to the individual vacuum generators 2 by means of an assembly supply duct 22 which passes through all the vacuum generators 2 in the direction of alignment 8 and, by way of example, opens out at the first end module 18a with a connection port 22a to which an external source of compressed air P is connected during operation of the vacuum unit 1.

In the vacuum generators 2, the assembly feed channel 22 communicates with an electrically operable control valve 23 belonging to the respective vacuum generator 2, which is also referred to hereinafter as vacuum control valve 23.

Preferably, the vacuum generators 2 arranged in a row are also traversed in the direction of arrangement 8 by at least one common air ventilation channel 24 which can be used for venting purposes, which is referred to as an assembly air ventilation channel 24 and which is present in exemplary duplicate. The at least one assembly air ventilation channel 24 is connected to the atmosphere via an exemplary vent opening 24a arranged on the outside of the first end module 18a.

However, the at least one assembly air ventilation channel 24 is exemplarily functionless. For this purpose, the vacuum generators 2 are internally designed, for example, in such a way that there is no fluid connection between the at least one assembly air ventilation channel 24 and the vacuum control valve 23, which is readily apparent from FIG. 5. Nevertheless, it is of course possible to provide such an internal fluid connection in the vacuum generators 2 if this should be functionally expedient.

If, as mentioned, the vacuum generator assembly 1a also includes one or more valve units suitable for pneumatic actuation of pneumatic actuators, the at least one assembly air ventilation channel can be used to vent these valve units together.

Both the assembly feed channel 22 and the at least one optional assembly air ventilation channel 24 are composed of channel segments arranged in a row, which are formed as through channels in the individual vacuum generators 2. Seals arranged between adjacent vacuum generators 2, which are not illustrated in more detail, provide a seal in the transition areas.

The vacuum generator assembly 1a expediently contains an electrical communication line extending in the direction of arrangement 8 through all the functional units 12, which on the one hand has the electrical interface 20 already mentioned and on the other hand has within each vacuum generator 2 a communication structure 25a electrically connected to the associated vacuum control valve 23. In this way, the vacuum control valves 23 receive the electrical control signals required for their operation from the electronic control unit 21. The communication line 25 extends in a cavity which passes through all the vacuum generators and is designated as a communication channel 29, which is composed of channel segments of the individual vacuum generators 2 arranged in a row.

The communication line 25 contains several communication structures 25a, each arranged in one of the vacuum generators 2. By way of example, the communication line 25 is implemented by means of a printed circuit board arrangement, which is composed of printed circuit boards of the individual vacuum generators 2, which are electrically conductively plugged together in the attached state of the vacuum generators 2 to form an assembly-like printed circuit board arrangement and are thus electrically and mechanically interlinked. Each printed circuit board thereby forms a communication structure 25a. Alternatively, the printed circuit board arrangement can also comprise a single continuous printed circuit board, in particular a single-piece printed circuit board, with length sections of this continuous printed circuit board forming the individual communication structures 25a. In particular, if the vacuum unit 1 comprises only a single vacuum generator 2, the communication structure 25a can be formed, for example, as an individual electromechanical interface element that enables a cable connection to an external electronic control unit 21.

In the following, a preferred structure of a vacuum generator 2 is described with particular reference to FIGS. 5 to 9. The described structure applies expediently to all vacuum generators 2 of the vacuum generator assembly 1a.

The vacuum generator 2 has an imaginary main axis 26 indicated by a dotted line, the axis direction of which is referred to as the main direction 26a. The dimensions in the main direction 26a define an overall length of the vacuum generator 2.

The vacuum generator 2 further has a vertical axis 27 orthogonal to the main axis 26, the axial direction of which is referred to as the height direction 27a, the dimensions in the height direction 27a defining an overall height of the vacuum generator 2.

Figure 3:
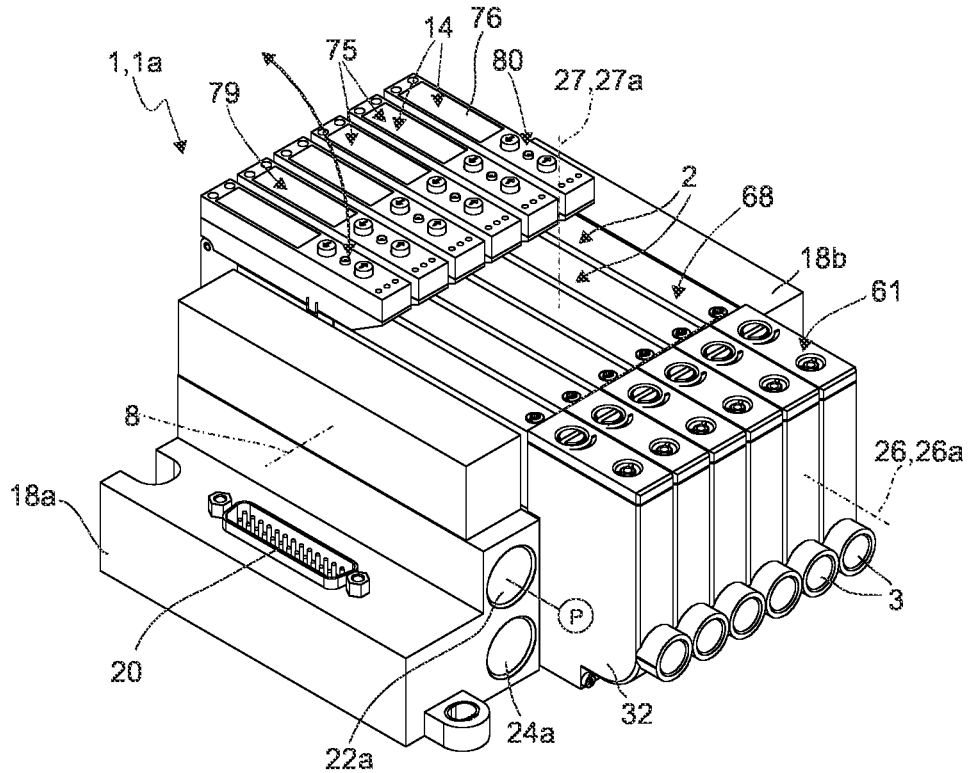

Finally, the vacuum generator 2 has an imaginary transverse axis 28 orthogonal to both the main axis 26 and the vertical axis 27, the axial direction of which defines a transverse direction 28a. The dimensions in the transverse direction define a structural width of the vacuum generator 2. In FIG. 3, the transverse axis 28 is perpendicular to the drawing plane.

The vacuum generator 2 has two axial end faces 44a, 44b oriented opposite to each other in the main direction 26a, which are also referred to as front end face 44a and rear end face 44b in the following for better differentiation. The vacuum generator 2 further has a top side 44c oriented in the height direction 27a and a bottom side 44d opposite to the top side 44c. In a usual orientation during operation of the vacuum unit 1, the top side 44c faces vertically upward. However, in principle, the vacuum unit 1 can be operated with any spatial orientation of the aforementioned four sides 44a-44d.

Preferably, the vacuum generators 2 are plate-shaped, which applies to the illustrated embodiment example. In this case, the overall length is greater than the overall height, which in turn is greater than the overall width. A main expansion plane of the plate-shaped vacuum generators 2 runs perpendicular to the transverse axis 28. The vacuum generators 2 are lined up with main expansion planes parallel to one another.

The vacuum generator 2 is made up of several parts. It comprises a working unit 12, which in turn is composed of two subunits, namely the vacuum control valve 23 and a base unit 13 supporting the vacuum control valve 23. Furthermore, it has a display and control module 14 attached to the base unit 13.

A receiving space 38 extending in the main direction 26a is formed inside the base unit 13, which is also referred to below as the ejector receiving space 38 and in which an ejector unit 42 having a longitudinal extension is received. The ejector unit 42 has a longitudinal ejector axis 43, which preferably runs parallel to the main axis 26.

Compressed air can flow through the ejector unit 42 to generate a vacuum that can be tapped at the vacuum tapping opening 3. The compressed air supply required for this can be controlled by the vacuum control valve 23.

In an exemplarily realized preferred design, the base unit 13 comprises a base body 31 and a silencer housing 32 attached to the base body 31 in a joining area 34, in particular consisting of plastic. Preferably, the silencer housing 32 is attached to the base body 31 in the main direction 26a, exemplarily being located at the front end face 44a. The base body 31 can, for example, be made of plastic or metal and is expediently formed in one piece. The silencer housing 32 accommodates a silencer 33.

Fastening means 37 provide a preferably releasable mechanical connection between the silencer housing 32 and the base body 31. Exemplarily, the fastening means 37 include at least one fastening screw 37a which passes through the silencer housing 32 in the main direction 26a, being supported by a screw head on the silencer housing 32 and being screwed into the base body 31 by a threaded shank.

The ejector unit 42 has a jet nozzle 45 axially penetrated by a jet nozzle channel 45a and a catch nozzle 46 axially penetrated by a catch nozzle channel 46a and axially spaced therefrom. The axial spacing between the jet nozzle 45 and the catch nozzle 46 forms a suction zone 47. A respective sealing ring 48a, 48b enclosing the jet nozzle 45 and the capture nozzle 46 seals off the ejector unit 42 from the peripheral wall surface of the ejector receiving chamber 38, so that both an air inlet region 49 upstream of the jet nozzle 45 and an air outlet region 50 downstream of the capture nozzle 46 are separated from the extraction zone 47 in a fluid-tight manner.

The ejector unit 42 expediently extends partly in the base body 31 and partly in the silencer housing 32, passing through the joining area 34. However, it can also be accommodated entirely inside the base body 31 or the silencer housing 32.

The jet nozzle channel 45a is constantly fluidically connected to an air injection channel 54 extending in the base body 31. Specifically, this is realized in that the air injection channel 54 opens into the air inlet area 49.

The air injection channel 54 passes through the base body 31 and opens via a first mouth opening 55 to a valve mounting surface 56 of the base unit 13, which is exemplarily formed on the base body 31 and on which the vacuum control valve 23 is mounted so as to be connected to the air injection channel 54 via the first mouth opening 55.

The assembly feed channel 22 mentioned further above also opens out with a second channel mouth 57 to the valve mounting surface 56 in such a way that it is fluidically connected to the vacuum control valve 23. In the case of a vacuum unit 1 formed by a single vacuum generator 2, the compressed air source P can also be connected directly to the vacuum control valve 23 outside the base body 31 without further ado.

The valve mounting surface 56 is exemplarily formed on an upper side of the base body 31 facing the upper side 44c of the vacuum generator 2. In particular, the valve mounting surface 56 extends in at least one plane orthogonal to the vertical axis 27 and may be stepped.

Expediently, the base unit 13 bounds a valve receiving area 15 which is open at least towards the upper side 44c of the vacuum generator 2, which is bounded on a lower side by the valve mounting surface 56 facing the upper side 44c and in which the mounted vacuum control valve 23 is received.

The valve mounting area 15 is bounded towards the front end face 44a by the silencer housing 32 projecting upwards above the base unit 31 and towards the rear end face 44b by a component of the base unit 13 designated as the module support section 16, which supports the display and control module 14 and also projects vertically above the base unit 31.

In accordance with the illustrated embodiment example, the module support section 16 is preferably attached to the base body 31 as a separate component. The base body 31 is expediently arranged in the main direction 26 between the silencer housing 32 and the module support section 16. Exemplarily, the base body 31 has an attachment surface 35 on its rear side opposite the joining area 34 in the main direction 26a, to which the module support section 16 is attached by means of a mounting surface 36 formed on it. The fastening, in particular a releasable fastening, is effected by module carrier fastening means 39, which exemplarily comprise at least one fastening screw 39a, which passes through the module carrier section 16 in the main direction 26a, wherein it is supported by a screw head on the module carrier section 16 and is screwed into the base body 31 by a threaded shank.

Exemplarily, the module support fastening means 39 contain, in addition to the at least one fastening screw 39a, a hook structure 39b spaced in the height direction 27a in this respect for mutually positively hooking the module support section 16 and the base body 31.

In particular, the module support section 16 has a longitudinal shape and is structured in an exemplary beam-like manner. The module support section 16 is attached to the base body 31 with a longitudinal module support axis 51 parallel to the vertical axis 27, terminating in the region of the upper surface 44c with an end portion projecting upwardly beyond the valve mounting surface 56 and designated as the upper module support end portion 16a.

The vacuum control valve 23 has a lower valve surface 66 facing the valve mounting surface 56 in the assembled state and abutting the valve mounting surface 56, and an upper valve surface 67 opposite thereto in the height direction 27 and facing away from the valve mounting surface 56. The upper valve surface 67 is part of an upper outer surface 68 of the working unit 13 located in the region of the upper side 44c of the vacuum generator 2, which also includes, by way of example, the air exhaust surface 61 formed on the silencer housing 32 and adjoining the upper valve surface 67 in the main direction 26a.

A sealing device, not illustrated, is conveniently located between the lower valve surface 66 and the valve mounting surface 56.

The vacuum control valve assembly 23 is releasably attached to the valve mounting surface 56 by valve attachment means 30. Preferably, the fastening is done by a screw connection. Exemplarily, the valve fastening means 30 include two fastening screws 30a, 30b, which penetrate the vacuum control valve 23 at locations spaced apart from one another in the main direction 26a in the height direction 27a, wherein they are each supported by a screw head on the upper valve surface 67 and are screwed into the base body 31 by a threaded shank projecting beyond the lower valve surface 66.

By means of the vacuum control valve 23, the application of compressed air to the air injection channel 54 is controllable. Thus, the vacuum control valve 23 can be switched to a vacuum setting "VS" in which it connects the assembly feed channel 22 to the air injection channel 54 in order to feed compressed air into the jet nozzle channel 45a of the jet nozzle 45. Furthermore, the vacuum control valve 23 can suitably also be switched to a shut-off position "AS" in which the air injection channel 54 is disconnected from the assembly feed channel 22 and consequently from the compressed air source P.

Connected to the outlet opening of the catch nozzle channel 46a facing away from the jet nozzle 45, beginning with the air outlet area 50, is an air blow-out channel 58 which passes through the silencer housing 32 and the silencer 33 located therein and opens out to the surroundings at an outer surface of the silencer housing 32 designated as the air exhaust surface 61 with an air exhaust opening 62.

Preferably, the air exhaust surface 61 including the air exhaust opening 62 is formed on the silencer housing 32 with an orientation perpendicular to the main axis 26. Preferably, and in accordance with the illustrated embodiment, the air exhaust surface 61, as well as the air exhaust opening 62 formed therein, faces in the height direction 27a, and thereby expediently faces upward. The air exhaust surface 61, like the air exhaust opening 62, is thereby arranged in particular on the upper side 44c of the vacuum generator 2. The air exhaust surface 61 expediently runs in a plane orthogonal to the vertical axis 27a.

A vacuum channel 63 is formed inside the vacuum generator 2, which extends between the suction zone 47 and the vacuum tapping opening 3. The vacuum tapping opening 3 opens out at an outer surface of the silencer housing 32 referred to as the vacuum tapping surface 64, which is preferably located at the front end face 44a. Suitably, the vacuum tapping opening 3 is oriented in the main direction 26a as a whole, as is the vacuum tapping surface 64.

The vacuum tapping opening 3 is provided with a connection device 65 which allows the detachable connection of a suction line 5 and which, by way of example, consists of an internal thread. A hose plug-in coupling can also be provided as a connection device 65, for example.

The above explanations make it clear that there is an angle of 90 degrees between the orientations of the vacuum tapping opening 3 and the air exhaust opening 62. Among other things, this has the effect that suction gripping actions taking place in the vicinity of the vacuum tapping opening 3 are not impaired by the exhaust air blown out at the air exhaust opening 62. In particular, even very light objects to be handled cannot be accidentally blown away.

The vacuum channel 63 passes through the silencer housing 32 in the main direction 26a, in particular with a linear extension.

The ejector unit 42 operates according to the known jet nozzle principle. Compressed air fed into the jet nozzle 45 of the ejector unit 42 flows through the ejector unit 42 and causes a vacuum in the suction zone 47, which results in the suction flow 7 already described, so that a vacuum can also be tapped at the vacuum tapping opening 3 and a connected suction gripper 4 is evacuated for gripping an object 6.

Preferably, the air blow-off channel 58 in the silencer housing 32 has a channel course deflected by 90 degrees in order to deflect the compressed air exiting the ejector unit 42 in the main direction 26a to the air exhaust opening 62 oriented transversely to the main direction 26*a*. The air exhaust channel 58 passes through the silencer 33, which is preferably formed as a so-called open silencer through which the air exhaust channel 58 passes completely axially, In an exemplary embodiment, the interior of the silencer housing 32 includes an intersection region 74 in which the air exhaust passage 58 and the vacuum passage 63 intersect without mutual fluid communication. Expediently, the vacuum channel 63 is divided within the silencer housing 32 into two channel branches spaced apart from each other in the transverse direction 28*a*, which pass the air exhaust channel 58 on opposite sides of each other in the transverse direction 28*a*. The exhaust flow 7 thus divides at a first duct branch point into two partial flows each passing through one of the two duct branches, these two partial flows reuniting at a second duct branch point Vacuum generation always takes place as long as a blowing air flow 77, indicated by an arrow, flowing through the ejector unit 42 is generated by the vacuum control valve 23 and exits at the air exhaust opening 62. Preferably, a movable check valve member 78 is arranged in the course of the vacuum channel 63, which, when the blowing air flow 77 is interrupted, closes the vacuum channel 63 in a region located between the suction zone 47 and the vacuum tapping opening 3, so that the vacuum present at the vacuum tapping opening 3 is trapped and no ventilation can take place through the ejector unit 42. This is associated with an air-saving effect, since a blast air flow 77 is required only temporarily to compensate for leakage in order to maintain a desired vacuum. The check valve member 78 allows air flow in the direction of the suction zone 47 only when the air pressure present at the suction zone 47 is lower than the air pressure at the vacuum tapping opening 3. If the air pressure at the suction zone 47 is higher than at the vacuum tapping opening 3, the check valve member 78 assumes a closed position closing off the vacuum channel 63.

In the embodiment, the check valve member 78 is arranged in the joining area 34 between the base body 31 and the silencer housing 32, being clamped between the base body 31 and the silencer housing 32 and thus securely held. Preferably, the check valve member 78 is a pivotable check valve.

The vacuum generator 2 expediently offers the possibility of cancelling a vacuum present at the vacuum tapping opening 3, in particular at any desired time, in order, for example, to deposit or discard an object 6 previously gripped by means of a suction gripper 4. Provided that no check valve member 78 is present, this can be done simply by switching the vacuum control valve 23 to the shut-off position "AS" to prevent further feeding of compressed air into the air injection channel 54.

It is advantageous if the vacuum generator 2 offers the possibility of applying an overpressure to the vacuum tapping opening 3 in a pulse-like manner in order to abruptly reduce the vacuum present with an ejector pulse and to quickly eject a possibly seized object 6. The illustrated embodiment has such equipment for generating an ejection pulse.

The aforementioned ejector pulse equipment includes a air ventilation channel 81 formed in the base unit 13, which on the one hand is connected to the vacuum control valve 23 via a third channel mouth 82 formed on the valve mounting surface 56, and on the other hand is in fluid communication with the vacuum channel 63.

The vacuum control valve 23 can preferably be switched to a third switching position referred to as the venting position "BS", in which the air ventilation channel 81, which is shut off in the other two switching positions, is connected to the assembly feed channel 22 and is pressurized with compressed air. As a result, an air ventilation flow 41 exiting at the vacuum tapping opening 3 is created in the air ventilation channel 81, so that an overpressure is present at the vacuum tapping opening 3 and the vacuum prevailing in a connected suction gripper 4 up to that point is cancelled.

The "BS" ventilation position is generally only set for a short time, so that the generated overpressure occurs as only a brief ejection pulse. However, a longer ventilation can also take place without further ado, for example in order to blow a dropped object 6 clean and free it from adhering impurities by means of blown-out compressed air. In principle, ventilation or maintenance of the ventilation position "BS" can be carried out for any length of time.

It is expedient that the ejector pulse equipment offers the possibility of being able to variably adjust the intensity of the ejector pulse. For this purpose, an air regulator 84 is inserted in the course of the air ventilation channel 81, which effects a flow restriction. The air regulator 84 has a choke 85 which is adjustably arranged in the silencer housing 32 and which is in particular a throttle screw. The choke 85 is accessible for its adjustment from outside the vacuum generator 2, wherein it has, by way of example, an actuating section 86 which is arranged in the region of the air exhaust surface 61 and is designed for manual actuation and/or for tool-assisted actuation.

The vacuum generator 2 is expediently equipped with a pressure sensor 87, by means of which the air pressure prevailing at the vacuum tapping opening 3, and in particular a negative pressure, can be detected.

The pressure sensor 87 is expediently located in the base unit 13 and there, in particular, in the base body 31. The pressure sensor 87 communicates with a sensor channel 88 formed in the base unit 13, which is fluidically connected to the vacuum channel 63 and can thus tap the pressure prevailing therein to act on the pressure sensor 87. By way of example, the sensor channel 88 passes through the joining region 34 and extends partly in the base unit 31 and partly in the silencer housing 32.

The pressure sensor 87 is preferably seated on a sensor board 91 mounted in the base body 31, which is exemplarily inserted from the underside 44*d* into a board receptacle 92 formed in the base body 31. Via a contacting device 89, the sensor board 91 is electrically connected to the communication structure 25*a*, which is also arranged in the base body 31, so that electrical signals based on the measured values of the pressure sensor 87 can be transmitted to the electronic control unit 21. In particular, the electrical signals are signals corresponding to the switching states of the vacuum control valve 23 or other parameters. In other words, the electrical signals may be both the raw measured values of the pressure sensor 87 and signals generated by an electronic evaluation of these raw measured values.

Preferably, the sensor board 91 is equipped with evaluation electronics that can evaluate the measured values of the pressure sensor 87 in order to influence the electrical control of the vacuum control valve 23 depending on the result. The evaluation electronics can, for example, also be located only in part on the sensor board 91 and arranged with another part on or in the communication structure 25*a*. In this case, evaluation or signal processing takes place partly on the sensor board 91 and partly on or in the communication structure 25*a*.

The vacuum control valve 23 is expediently of an electropneumatically pilot-controlled design and includes a main valve 93, exemplarily permitting the above-mentioned three switching positions "VS", "AS, "BS", as well as a pilot valve 94 combined with the main valve 93 to form a uniformly manageable structural unit. The pilot valve 94 is electrically connected to the communication structure 25a via an electrical contacting device 95, and is electrically operable by means of control signals which can be supplied from the electrical control unit 21. The pilot valve 94 is capable of pneumatically actuating the main valve 93 to set one of the three switching positions "VS", "AS, "BS" mentioned above, respectively. The compressed air required for this purpose is supplied to the pilot valve 94 through the main valve 93 via a pilot feed channel 96 formed in the base body 31. The pilot feed channel 96 expediently passes through all vacuum generators 2 of the vacuum generator assembly 1a and leads to a connection opening 96a formed in the second end module 18b, to which a control pressure source PS can be connected or is connected.

Conveniently, for common venting of the pilot valves 94 of all the vacuum generators 2, there is provided a pilot vent passage 97 passing through the vacuum generators 2, to which the pilot valves 94 are each connected through the main valve 93 and which leads to a vent opening 97a formed on the second end module 18b and opening to the atmosphere RS.

Exemplarily, each pilot valve 94 includes two electrically operable pilot valves 94a, 94b combined into one unit, which are expediently solenoid valves.

The pilot valve 94 is conveniently attached to one of the two axial end faces of the main valve 93. Exemplarily, the vacuum control valve 23 is oriented such that the pilot valve 94 faces the module support section 16. The upper valve surface 67 is composed of an upper main valve surface portion 67a formed on the main valve 93 and an upper pilot valve surface portion 67b adjoining thereto in the main direction 26a and formed on the pilot valve 94. The two mounting screws 30a, 30b preferably extend through the main valve 93.

The vacuum control valve 23 is expediently equipped with two manual override actuators 69a, 69b, which enable purely manual actuation of the vacuum control valve independently of electrical control signals. Preferably, the two manual override actuators devices 69a, 69b are each associated with one of the two pilot valves 94a, 94b and enable manual actuation of these pilot valves 94a, 94b in order to set a desired switching position of the main valve 93.

Each manual override actuator 69a, 69b has an actuating element 70 that can be activated manually, these two actuating elements 70 being arranged on the upper valve surface 67 and there in particular on the upper pilot valve surface section 67b. The actuating elements 70 are thus basically accessible for their actuation from the upper side 44c of the vacuum generator 2.

Preferably, there are also at least two display elements 71 on the upper valve surface 67, which at least partially function, for example, as status display elements of the vacuum control valve 23 and are capable of visualizing one or more of the switching positions described above. The display elements 71 are designed in particular as luminous display elements. Exemplarily, they are formed by the upper end portions of a plurality of light guides 72 which pass through the pilot valve 94 and lead to a light emitting diode device 73 formed as part of the communication structure 25a. Light signals emitted from the light-emitting diode device 73 are passed through the light guides 72 to the display elements 71, where they are output.

Depending on the configuration of the vacuum control valve 23, there may also be a number of actuating elements 70 and indicating elements 71 other than those described. Furthermore, actuating elements and/or display elements intended for other purposes may be arranged on the upper outer surface 68 as an alternative to or in addition to the equipment described.

The display and control module 14 already mentioned above is arranged on the working unit 12 in a swivel-mounted manner. It can assume a basic position shown in FIGS. 1 to 3, 5 and 7, in which it extends in the region of the upper side 44c of the vacuum generator 2 in the main direction 26a along the working unit 12. The pivotable mounting is implemented by means of a pivot bearing 52, wherein it is advantageous if the pivotable mounting takes place, in accordance with the illustrated embodiment example, at the module support section 16 and there in particular at its upper module support end section 16a. Accordingly, the pivot bearing 52 is located in the region of one of the two axial end faces 44a, 44b of the vacuum generator 2—in the embodiment example this is the region of the rear end face 44b—, and the pivot bearing 52 is at the same time located in the region of the top face 44c of the vacuum generator 2.

In consideration of the illustrated preferred embodiment of the vacuum control valve 23, the pivot bearing means 52 is arranged adjacent to the pilot valve 94 in the main direction 26a, wherein the pivot center 53 for the possible pivotal movement of the display and control module 14 in the height direction 27a, referred to as the module pivotal movement 59, is at least substantially and preferably exactly at the same level as the adjacent surface section of the upper outer surface 68 of the working unit 12. This surface portion is, by way of example, the pilot valve surface portion 67b. The module pivoting movement 59 is illustrated by a double arrow in FIGS. 1, 3, 4 and 5.

During module swivel 59, the display and control module 14 swivels relative to the working unit 12 in a swivel plane 10 parallel to the main axis 26 and the vertical axis 27.

In view of the fact that the vacuum tapping opening is located at the front end face 44a, the swivel center 53 of the module swivel movement 59 and the vacuum tapping opening 3 are arranged at axial end faces 44a, 44b of the vacuum generator 2 opposite each other in the main direction 26a.

The display and control module 14 has a longitudinal shape with a dash-dotted longitudinal axis designated as the module longitudinal axis 60. In the basic position of the display and control module 14, the module longitudinal axis 60 is expediently aligned at least substantially parallel to the main axis 26 of the vacuum generator 2. In this case, the display and control module 14 extends from the rear end face 44b in the direction of the opposite front end face 44a. Although it would in principle be possible to design the construction length of the display and control module 14, measured in the axial direction of the module longitudinal axis 60, in such a way that it extends over the entire length of the working unit 12 in the basic position, it is considered to be substantially more advantageous to implement a shorter construction length in accordance with the illustrated embodiment example, so that the display and control module 14 only extends over a partial length of the working unit 12 in its basic position.

Preferably, the overall length of the display and control module 14 is selected in such a way that even the vacuum control valve 23 is covered by the display and control module 14 only along part of its length in the main direction 26a. Exemplarily, the display and control module 14 assuming the basic position extends over the entire pilot valve 94 and an adjoining length section of the main valve 93.

Conveniently, the display and control module 14 in its basic position thus covers only a section of the length of the working unit 12 that adjoins the swivel center 53 and is shorter than the overall length of the working unit 12.

Figure 5:
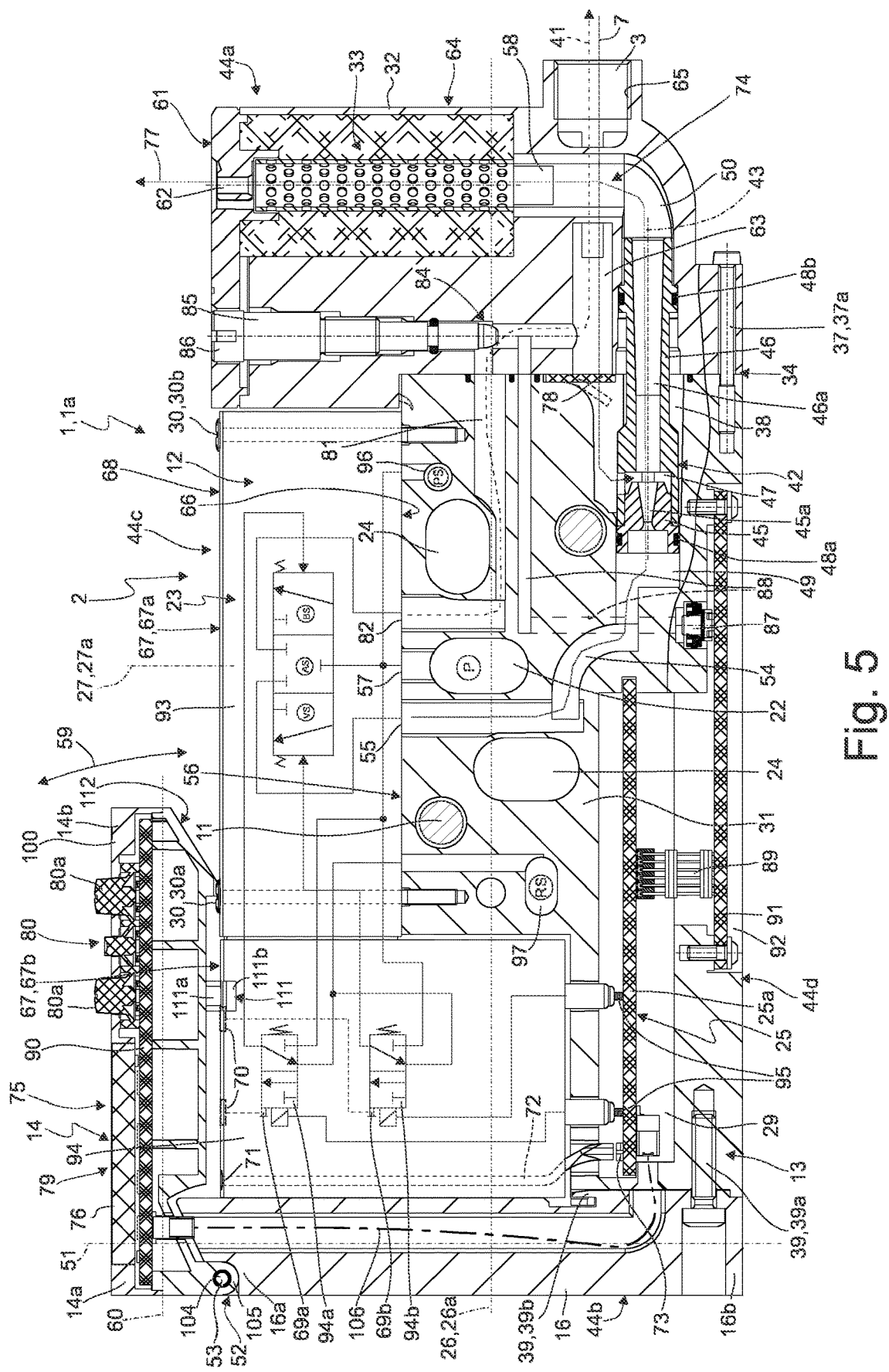
FIG. 5: a section through the vacuum unit of FIGS. 1 to 4 in the area of a vacuum generator according to section line V-V of FIG. 2, wherein the display and control module is shown in the basic position and wherein a vacuum control valve is only symbolically illustrated.

FIG. 5 makes it clear that the pivot center 53 is conveniently spaced from the vacuum control valve 23 in the main direction 26a.

That longitudinal side of the display and control module 14 which is oriented orthogonally to the module longitudinal axis 60 and which, in the basic position, points upwards away from the working unit 12 in the height direction 27a is referred to below as the function side 75 of the display and control module 14. On this function side 75, the display and control module 14 has both a display module 79 designed for visualization of status information relating to the vacuum generator 2 and a control module 80 designed for manual input and/or query of operating parameters relating to the vacuum generator 2. Both devices 79, 80 are clearly visible and easily accessible from the top side 44c in the basic position of the display and control module 14.

The display and control module 14 is electrically connected to the communication structure 25a inside the vacuum generator 2. Specifically, this electrical connection on the part of the display and operator module 14 refers to electrical and/or electronic components 83 present for implementing the display module 79 and the operator device 80, with which a module board 90 is equipped, which is located inside a module housing 100 of the display and operator module 14.

Components 83 present to implement the display module 79 include, for example, a plurality of light emitting diodes 79a. In this way, the display module 79 is an LED display module. The display module 79 is designed in particular for an alphanumeric display of status information. For example, actual vacuum values determined by the pressure sensor 87, desired set vacuum values, switching points of the vacuum control valve 23, hysteresis, error diagnoses or the like are displayed.

By means of the operating device 80, operating parameters such as the set vacuum value or switching points of the vacuum control valve 23 can be set, whereby a menu-guided input is preferred, in which case the display module 79 is also designed for visualization of the individual menu items. By manual operation of the operating device 80, settings or operating parameters that have been made can also be actively queried, in particular again in a menu-guided manner.

By way of example, the module housing 100 is transparent on the functional side 75, at least in the area of the display module 79, so that the visualized display values can be read without difficulty. A window-like area 76 of the hollow module housing 100 that is at least partially transparent or translucent for this purpose is realized, for example, by a plastic element of the module housing 100 that has corresponding light-transmitting properties.

The window-like region 76 can, for example, consist of an opaque film that is thin-walled in segments such that it can be illuminated by the light-emitting diodes 79a. In particular, the thin-walled regions have transparent or translucent properties.

In addition to the aforementioned components 83 of the module board 90, the operating device 80 also includes, by way of example, one or more operating keys 80a which are located on the module board 90 and project through wall openings of the module housing 100 in the region of the function side 75, so that they can be operated with the finger of one hand. Exemplarily, three operating keys are provided, which are two arrow keys and one set key. The operating keys 80a are preferably implemented as components of a rubber-elastic switching mat.

The pivot bearing 52 makes it possible to swivel the display and control module 14 from the basic position to at least one swivel position swiveled upwardly away from the working unit 12 and also back to the basic position within the scope of a module swivel movement 59. When using the vacuum unit 1, one thus has the option of positioning the display and control module 14 either in the basic position or in at least one position pivoted away from the upper outer surface 68, referred to as the pivoted position.

Preferably, a maximum swivel angle for the module swivel movement 59 is mechanically predetermined by the design of the pivot bearing 52.

In at least one swivel position, the display and control module 14 can be detachably fixed by latching. Latching fixation can be possible in several swivel positions. Preferably, however, the display and control module 14 can be detachably fixed by latching in exactly one swivel position. One fixable swivel position, and in particular the only fixable swivel position, is in particular a 90-degree swivel position described further below.

It is also possible to have an embodiment in which the display and control module 14 can be infinitely positioned as desired within a maximum swivel range, for example due to a frictional connection.

A preferred swivel position of the display and control module 14 is illustrated in FIGS. 4, 6, 8 and 9. This is an upright swivel position in which the display and control module 14 assumes a position swiveled upward by 90 degrees with respect to the basic position, which is also referred to below as a 90-degree swivel position. The module longitudinal axis 60 extends here in particular orthogonally to the main axis 26.

On the one hand, the pivotability of the display and control module 14 allows the orientation of the function side 75 to be varied in order to bring the display module 79 and the operating device 80 into a position that is favorable for the current application. For example, the display module 79 can be read particularly well from the rear end face 44b, especially in the 90-degree swivel position.

Furthermore, the display and control module 14 can be pivoted away from the upper valve surface 67 by the module pivoting movement 59 in such a way that the actuating elements 70 located there are directly accessible for manual activation and/or the display elements 71 also located there can be directly viewed.

Figure 6:
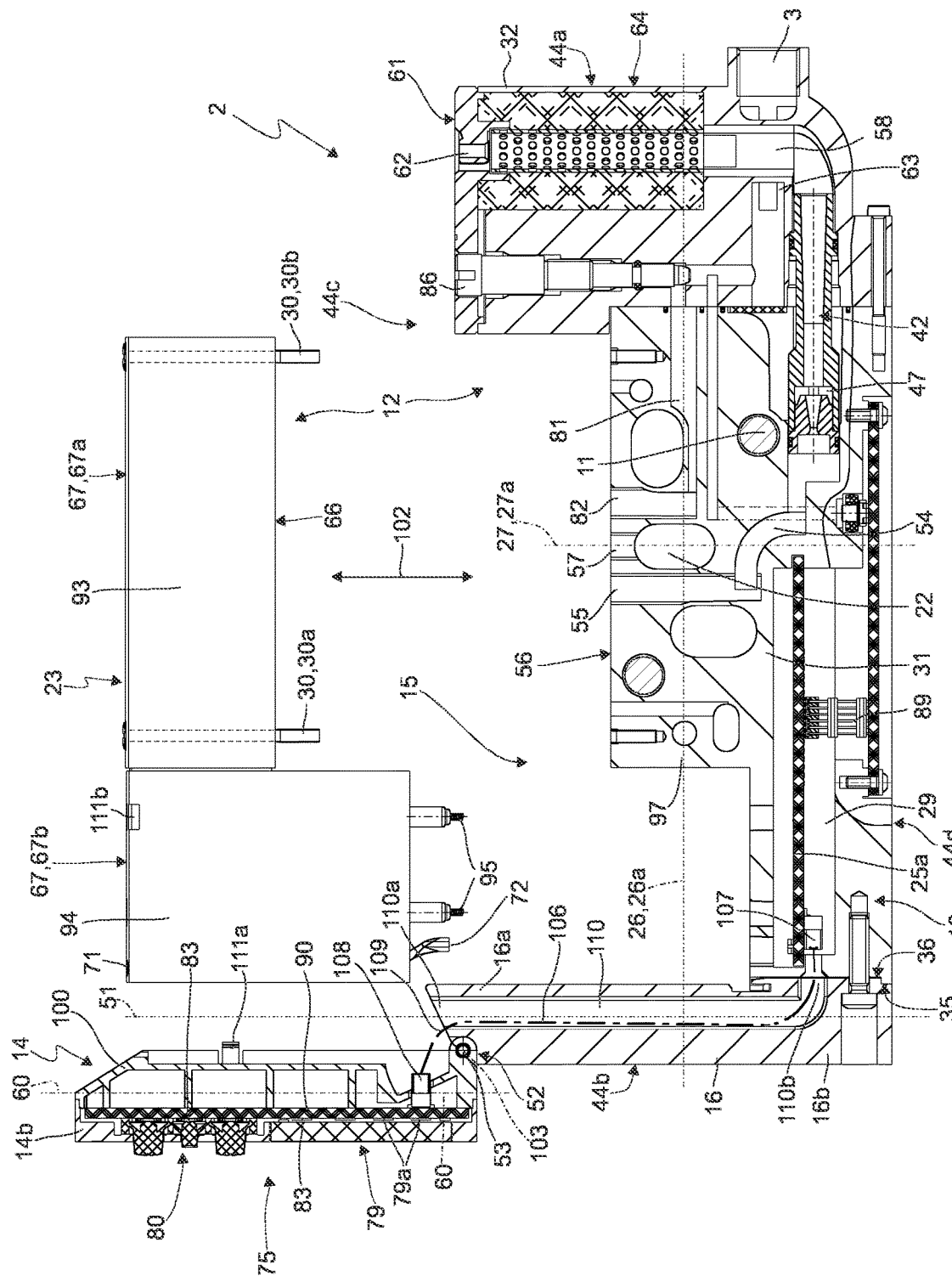
FIG. 6: a sectional view similar to FIG. 5, but with the display and control module swiveled to a 90-degree position and with the vacuum control valve removed and lifted from a valve mounting surface.
Figure 7:
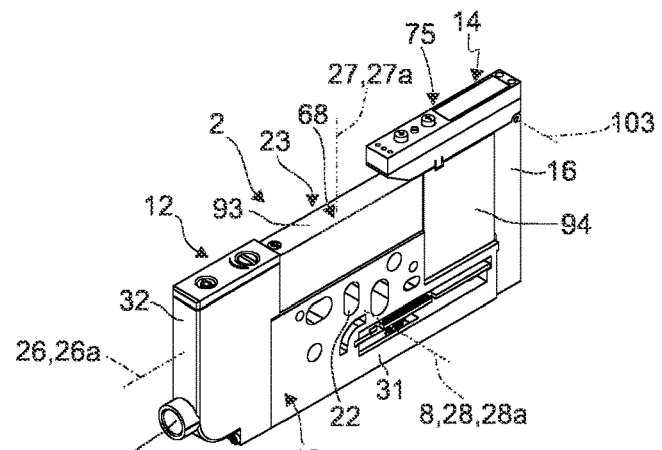
FIG. 7-9: are each an individual perspective view of one of the vacuum generators contained in the vacuum generator assembly of FIGS. 1 to 4, with FIG. 7 showing the assembled vacuum generator with the display and control module in the basic position analogous to FIG. 5.
Figure 8:
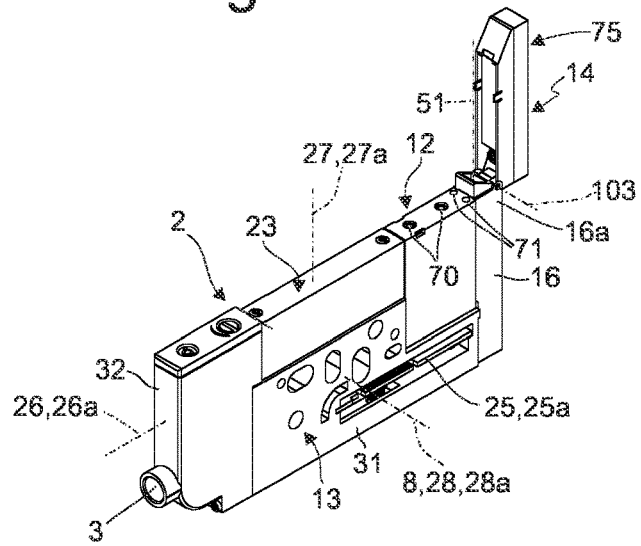
Figure 9:
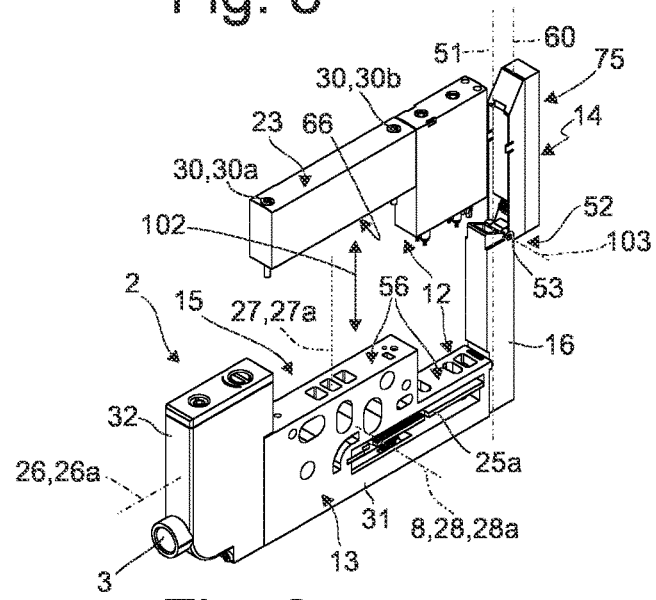

Last but not least, a display and control module 14 pivoted out of the basic position and in particular pivoted at least into the 90-degree pivoted position permits an assembly and disassembly of the vacuum control valve 23 illustrated in FIGS. 6 and 9, since the overlapping of the vacuum control valve 23 existing in the basic position is eliminated in this case. In particular, a linear assembly and disassembly movement 102 of the vacuum control valve 23 in the height direction 27a illustrated by a double arrow in FIGS. 6 and 9 is then possible to lift the vacuum control valve 23 off the valve mounting surface 56 or to place it against the valve mounting surface 56 when the valve mounting means 30 is released.

Since, in a vacuum generator assembly 1a, each communication structure 25a belongs to an electrical communication string 25, the display and control modules 14 of all vacuum generators 2 are in electrical communication with the communication string 25 and consequently with the electronic control unit 21.

The display and control module 14 expediently has the same width in the transverse direction 28a as the vacuum control valve 23, so that the upper outer surface 68 of the working unit 12 is completely covered over the entire length of the display and control module 14 in the basic position of the display and control module 14, at least in the region of the vacuum control valve 23.

The pivot center 53 of the module pivot movement 59 is suitably defined by a pivot axis 103 extending in the transverse direction 28a of the vacuum generator 2. This is exemplarily the case, wherein, moreover, the pivot bearing 52 is configured such that the swivel axis 103 is stationary with respect to the working unit 12 in any direction orthogonal to the transverse axis 28.

Deviating from the illustrated embodiment example, the swivel center 53 could be realized, for example, by a circular arc guide, for example in the form of at least one circular arc-shaped longitudinal slot formed on the working unit 12, which functions as a sliding block, into which the display and control module 14 is slidingly inserted with a sliding block follower.

The display and control module 14 is preferably a separate component with respect to the working unit 12, which applies to the illustrated embodiment. In this regard, the pivot bearing 52 expediently has at least one pivot bearing body 104 which is fixed to the module support section 16 with a longitudinal axis parallel to the transverse direction 28a and which is pivotally embraced by at least one, for example, lug-like bearing extension 105 of the display and control module 14. The bearing extension 105 is suitably an integral portion of the module housing 100, and it has an aperture through which the associated pivot bearing body 104 extends.

The at least one bearing extension 105 may be slotted so that it can be clipped onto the pivot bearing body 104, either non-detachably or in a detachable manner, for mounting the display and control module 14.

In accordance with the illustrated embodiment, the pivot bearing body 104 may be a separate component with respect to the display and control module 14 and the module support section 16.

More conveniently, the pivot bearing body 104 is formed as a pivot bearing pin in accordance with the illustrated embodiment.

In an unillustrated embodiment, the display and control module 14 has two flexurally flexible bearing extensions arranged next to one another at a mutual distance in the axial direction of the pivot axis 103, each of which has a bearing recess, in particular in the form of an opening, which is open on the outer side facing away from the respective other bearing extension. The module support section 16 has two pivot bearing bodies 104, which are formed as cylindrical bearing projections, each of which engages from the open outer side in the bearing recess of one of the two bearing extensions. For mounting the display and control module 14, the two bearing extensions can be briefly elastically bent toward each other to allow the bearing projections to snap into the bearing recesses.

For the electrical connection between the display and control module 14 and the communication structure 25a, a flexible conductor strand 106, which is only indicated by dashed dots, is expediently provided. This conductor strand 106 has a first strand end 107 electrically conductively attached to the communication structure 25a and a second strand end 108 electrically conductively attached to the module board 90. The attachment is in each case preferably implemented by means of a detachable plug connection.

The flexible conductor strand 106 includes a plurality of electrical conductors that are insulated from one another by means of a flexible plastic sheath. Preferably, the flexible conductor strand 106 is configured as a flexible flat cable. Alternatively, the flexible conductor strand 106 may be composed of a plurality of individual electrical conductors.

The bending flexibility of the conductor strand 106 permits an unimpeded module swiveling movement 59, whereby the second strand end 108, which is fixed to the display and control module 14, follows the module swiveling movement 59 and the conductor strand 106 is elastically deformed, and in particular partially bent.

Preferably, the conductor strand 106 is designed to be flexible over its entire length. However, the bending flexibility may also be limited only to an upper strand end section 109 associated with the second strand end 108, which passes the pivot bearing 52.

Preferably, a conduit 110 is formed inside the module support section 16, which on the one hand opens out at the upper module support end section 16a with an upper conduit opening 110a and which on the other hand opens out at a lower module support end section 16b with a lower conduit opening 110b. While the upper channel mouth 110a is preferably formed on the upwardly facing end face of the upper module support end section 16a, the lower channel mouth 110b is expediently located on the mounting surface 36 of the lower module support end section 16b facing the base body 29 in the main direction 26a. The lower channel mouth 110b communicates with communication channel 29, which is open to mounting surface 35. Conductor strand 106 extends from communication channel 29 through lower channel mouth 110b into conduit channel 110 and then through conduit channel 110, exiting at upper channel mouth 110a for connection to module board 90.

Figure 4:
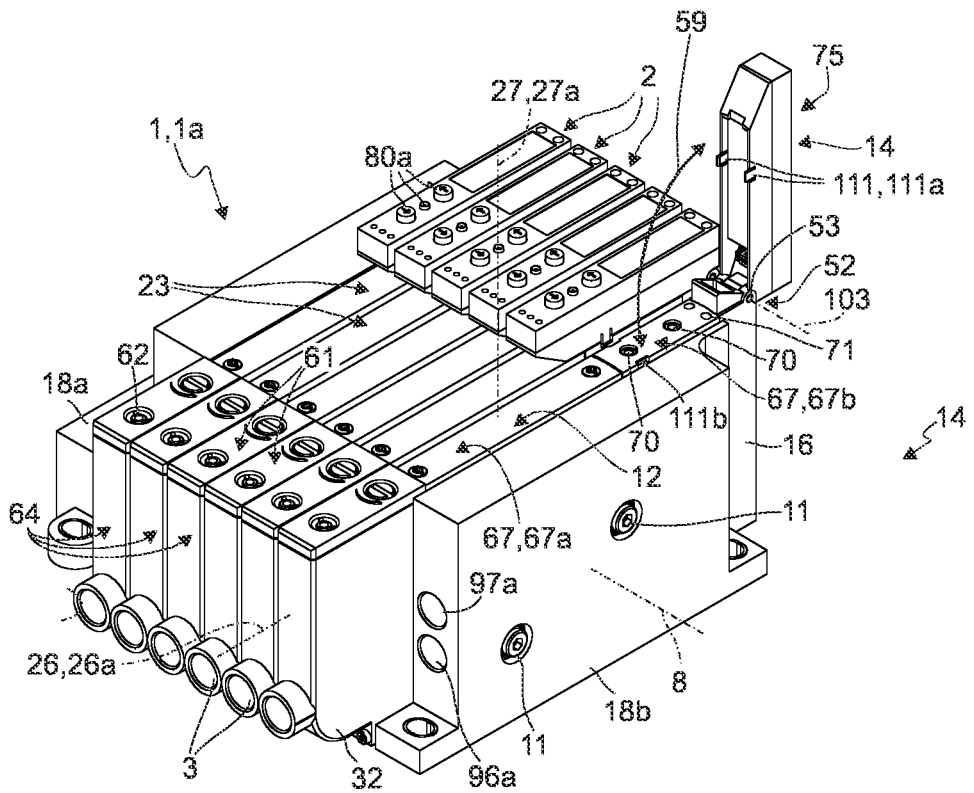

It is readily apparent from a comparison of FIGS. 4 and 5 that the flexible conductor strand 106 has sufficient length to move within the conduit channel 110 in accordance with the pivot angle of the display and control module 14 during the module pivot movement 59.

Preferably, the vacuum generator 2 is equipped with a latching connection 111, by means of which the display and control module 14 is fixed in the basic position in a non-pivotable manner by a releasable latch. Preferably, the latching connection 111 includes two flexibly flexible latching hooks 111a formed on the module housing 100 and projecting downward in the basic position, as well as a latching recess 111b formed in the region of the upper valve surface 67 in the vacuum control valve 23 for each latching hook 111a. When the display and control module 14 is pivoted from a pivot position to the home position, the detent hooks 111a automatically snap into the detent recesses 111b. The latching connection is easily released by manually applying a torque to the display and control module 14 in the sense of pivoting away from the vacuum control valve 23.

The display and control module 14 is designed in particular in the manner of a single-armed lever. It has a first axial end region 14a, with which the pivot bearing 52 and the pivot center 53 are associated, and a second axial end region 14b opposite thereto, with which the display and control module 14 ends freely. Expediently, the module housing 100 is chamfered at its second axial end region 14b on the underside facing the vacuum control valve 23 to form an actuating surface 112 inclined with respect to the longitudinal axis 60 of the module. The actuating surface 112 can be conveniently grasped with the finger of one hand for pivoting out of the home position.

The invention claimed is:

1. A vacuum unit with at least one vacuum generator extending in a main direction along a main axis and in a height direction along a vertical axis orthogonal to the main axis and in a transverse direction along a transverse axis orthogonal both to the main axis and to the vertical axis, which vacuum generator has two axial end faces oriented opposite one another in the main direction, an upper face oriented in the height direction and a lower face opposite the upper face, wherein the vacuum generator comprises a working unit with an ejector unit through which compressed air can flow in order to generate a vacuum which can be tapped at a vacuum tapping opening of the working unit, and with an electrically actuable vacuum control valve which controls the application of compressed air to the ejector unit, and wherein the vacuum generator has a display and control module which extends in the main direction along the working unit on the upper side of the vacuum generator when a basic position is assumed and which, on a function side pointing upwards away from the working unit in the basic position, has a display module for visualizing status information and an operating device for manual input and/or interrogation of operating parameters, wherein the display and control module is pivotably mounted on the working unit by means of a pivot bearing, so that it can be selectively positioned in the basic position or in at least one pivoted position pivoted upwardly away from the working unit by means of a module pivoting movement which can be executed with respect to a pivot center.

2. The vacuum unit according to claim 1, wherein the display and control module is fixed in its basic position by latching to the working unit in a detachable, non-pivotable manner.

3. The vacuum unit according to claim 1, wherein the pivot bearing is designed in such a way that the display and control module can be pivoted relative to the working unit by the module pivoting movement in a pivoting plane parallel to the main axis and the vertical axis.

4. The vacuum unit according to claim 1, wherein the pivot center of the module pivoting movement is defined by a pivot axis extending in the transverse direction of the vacuum generator.

5. The vacuum unit according to claim 4, wherein the display and control module is a separate component with respect to the working unit, the pivot bearing having at least one pivot bearing body which defines the pivot axis and via which the display and control module is coupled to the working unit such that it can pivot.

6. The vacuum unit according to claim 1, wherein the pivot bearing is arranged in the region of one of the two axial end faces of the vacuum generator.

7. The vacuum unit according to claim 6, wherein the vacuum tapping opening is arranged in the region of that of the two axial end faces of the vacuum generator which is opposite to that axial end face of the vacuum generator in the region of which the pivot bearing is located.

8. The vacuum unit according to claim 6, wherein the display and control module is shorter than the working unit and, in its basic position, extends in the main direction only over a partial length of the working unit, in such a way that, in the basic position, only a portion of the length of the working unit which adjoins the swivel center and is shorter than the total length of the working unit is covered by the display and control module.

9. The vacuum unit according to claim 1, wherein the pivot bearing is arranged in the region of the upper side of the vacuum generator, the pivot center being located in the height direction at least substantially at the same height as an adjacent surface section of the upwardly facing upper outer surface of the working unit.

10. The vacuum unit according to claim 1, wherein the display and control module can be pivoted at least into an upright pivoted position in which it is pivoted upwards by 90 degrees with respect to its basic position.

11. The vacuum unit according to claim 1, wherein the display and control module has the same width in the transverse direction of the vacuum generator as the vacuum control valve, so that the vacuum control valve is completely covered by the display and control module along its length in the basic position of the display and control module.

12. The vacuum unit according to claim 1, wherein the working unit has in its interior a communication structure which is electrically connected to the vacuum control valve to transmit valve control signals intended for the vacuum control valve and originating from an electronic control unit and is electrically connected to the display and control module via a flexible conductor strand which can be deformed during the module pivoting movement.

13. The vacuum unit according to claim 1, wherein the display and control module has a module housing in which a module board equipped with components of the display module and the operating device is arranged.

14. The vacuum unit according to claim 1, wherein the working unit of at least one vacuum generator has, in the region of the upper side of the vacuum generator, an upper outer surface which is at least partially covered by the display and control module in the basic position of the display and control module, which has, in the region covered by the display and control module, at least one manually activatable actuating element and/or display element which is accessible from the top side of the vacuum generator in at least one pivoted-up swivel position of the display and control module.

15. The vacuum unit according to claim 14, wherein the at least one actuating element and/or the at least one display element of the working unit is a component of the vacuum control valve.

16. The vacuum unit according to claim 15, wherein at least one actuating element belongs to a manually activatable manual override actuator of the vacuum control valve and/or wherein at least one display element is a status display element of the vacuum control valve.

17. The vacuum unit according to claim 1, wherein the working unit has a base unit containing the ejector unit, on which base unit the display and control module is pivotably mounted and on which base unit a valve mounting surface is formed, to which the vacuum control valve is attached.

18. The vacuum unit according to claim 17, wherein the display and control module, in its basic position, at least partially covers the vacuum control valve detachably mounted on the valve mounting surface facing the upper side of the vacuum generator in the height direction and can be pivoted into at least one pivoted position in which the covering of the vacuum control valve is removed to enable its assembly and disassembly.

19. The vacuum unit according to claim 17, wherein the base unit defines a valve receiving area which is open at least towards the upper side of the vacuum generator and is bounded on an underside by the valve mounting surface, in which the mounted vacuum control valve is received and which is bounded in the region of one of the two axial end faces of the vacuum generator by a module support section of the base unit, on which the display and control module is pivotably mounted via the pivot bearing.

20. The vacuum unit according to claim 17, wherein the base unit has a base body having the valve mounting surface and a silencer housing attached to the base body in a joining region, a silencer housing containing a silencer, wherein the ejector unit extends in the base body with at least a part of its length, which ejector unit has a jet nozzle, a catch nozzle and a suction zone arranged between the jet nozzle and the catch nozzle wherein the jet nozzle communicates with the vacuum control valve mounted on the valve mounting surface through an air injection channel formed in the base unit, by which a pressurization of the air injection channel is controllable, further wherein the suction zone communicates with the vacuum tapping opening formed on an outer vacuum tapping surface of the base unit through a vacuum passage, and wherein an air exhaust passage extending through the silencer housing and the silencer located therein is connected to the capture nozzle, the air exhaust passage opening to the surroundings with an air exhaust opening at an air exhaust surface of the silencer housing.

21. The vacuum unit according to claim 20 in connection with claim 19, wherein the module support section is attached to the base body as a separate component, wherein the base body being arranged in the main direction between the silencer housing and the module support section.

22. The vacuum unit according to claim 20, wherein said vacuum channel communicates with vacuum control valve mounted on said valve mounting surface via an air ventilation channel extending in said base unit, through which said vacuum channel can be pressurized to relieve a vacuum generated therein.

23. The vacuum unit according to claim 1, wherein the vacuum tapping opening communicates with a sensor channel that supplies the pressure prevailing at the vacuum tapping opening to a pressure sensor accommodated in the working unit, which is electrically connected to the display and control module.

24. The vacuum unit according to claim 1, comprising a vacuum generator assembly which has a plurality of vacuum generators which are lined up in a direction orthogonal to the main direction and are mechanically connected to one another, the working units of which are traversed in the direction of juxtaposition by an assembly feed channel provided for connection to an external compressed air source, which feed channel is connected in each vacuum generator to the vacuum control valve thereof in order to provide the compressed air required for controlling a pressurization of compressed air.

25. The vacuum unit according to claim 24, wherein the vacuum generators arranged in a row are interspersed in the direction of arrangement by an electrical communication line which is electrically connected to the vacuum control valve and the display and control module of all vacuum generators, and which has an interface for electrical connection to an electronic control unit.

* * * * *